United States Patent
Litoiu et al.

(10) Patent No.: US 12,032,714 B2
(45) Date of Patent: Jul. 9, 2024

(54) DISTRIBUTED GOVERNANCE FOR SHARING OF BIG DATA

(71) Applicant: Bitnobi, Inc., Toronto (CA)

(72) Inventors: Marin Litoiu, Toronto (CA); Mark Shtern, Toronto (CA)

(73) Assignee: BITNOBI INC., Toronto (CA)

( * ) Notice: Subject to any disclaimer, the term of this patent is extended or adjusted under 35 U.S.C. 154(b) by 314 days.

(21) Appl. No.: 17/421,778

(22) PCT Filed: Jan. 3, 2020

(86) PCT No.: PCT/CA2020/050006
§ 371 (c)(1),
(2) Date: Jul. 9, 2021

(87) PCT Pub. No.: WO2020/142835
PCT Pub. Date: Jul. 16, 2020

(65) Prior Publication Data
US 2022/0092209 A1    Mar. 24, 2022

Related U.S. Application Data

(60) Provisional application No. 62/790,527, filed on Jan. 10, 2019.

(51) Int. Cl.
*G06F 21/00* (2013.01)
*G06F 16/27* (2019.01)
(Continued)

(52) U.S. Cl.
CPC .......... *G06F 21/6227* (2013.01); *G06F 16/27* (2019.01); *G06F 16/955* (2019.01);
(Continued)

(58) Field of Classification Search
CPC .... G06F 21/6227; G06F 16/27; G06F 16/955; G06F 2221/2141; G06F 16/9566;
(Continued)

(56) References Cited

U.S. PATENT DOCUMENTS 11,308,448 B1 *  4/2022  Knas ................. H04L 63/10
11,632,360 B1 *  4/2023  Tan .................. G06F 3/0622
                                                    726/4

(Continued)

OTHER PUBLICATIONS

International Search Report/Written Opinion dated Mar. 23, 2020.

*Primary Examiner* — Ka Shan Choy
(74) *Attorney, Agent, or Firm* — Dickinson Wright LLP; Yuri Chumak (57) ABSTRACT

Methods and systems for secure, encrypted and distributed ownership and usage of big data are provided. According to one example, a server maintains a local key management data store, a data blockchain copy, an audit blockchain copy, and a metadata blockchain copy. A data operation from a user electronic device is received. The server verifies that the user electronic device has access against the local key management data store, runs the data operation and records metadata about the data operation, and writes data blocks to the data blockchain copy, the audit blockchain copy, and the metadata blockchain copy. The server broadcasts the updated blockchain copies to the peer-to-peer network for replication.

9 Claims, 9 Drawing Sheets

(51) Int. Cl.
    *G06F 16/955*     (2019.01)
    *G06F 21/62*     (2013.01)
    *H04L 9/32*     (2006.01)
    *H04L 9/00*     (2022.01)

(52) U.S. Cl.
    CPC .... *H04L 9/3263* (2013.01); *G06F 2221/2141* (2013.01); *H04L 9/50* (2022.05)

(58) Field of Classification Search
    CPC . G06F 21/6218; G06F 16/273; H04L 9/3263; H04L 9/50; H04L 63/10; H04L 2463/121; H04L 9/3239
    See application file for complete search history.

(56) References Cited

U.S. PATENT DOCUMENTS

| | | |
|---|---|---|
| 2015/0278820 A1 | 10/2015 | Meadows |
| 2017/0163733 A1* | 6/2017 | Grefen .................... H04L 67/53 |
| 2017/0230189 A1* | 8/2017 | Toll ........................ G06F 21/54 |
| 2018/0060596 A1* | 3/2018 | Hamel .................... G06F 21/62 |
| 2018/0060600 A1* | 3/2018 | Hamel .................... H04L 9/0891 |
| 2018/0268506 A1 | 9/2018 | Wodetzki et al. |
| 2019/0028277 A1* | 1/2019 | Jayachandran ......... H04L 9/085 |
| 2019/0332608 A1 | 10/2019 | Qiu |
| 2020/0162236 A1* | 5/2020 | Miller .................... G06F 40/174 |

\* cited by examiner

DISTRIBUTED GOVERNANCE FOR SHARING OF BIG DATA

FIELD OF THE INVENTION

The field of the invention is cryptography and, in particular, a platform for secure, encrypted and distributed ownership, storage and usage of big data.

BACKGROUND

The following description includes information that may be useful in understanding the present invention. It is not an admission that any of the information provided herein is prior art or relevant to the presently claimed invention, or that any publication specifically or implicitly referenced is prior art.

Many modern software applications rely heavily on big data, either as a core asset of their basic use cases or as supporting infrastructure used to improve quality of service. At the same time, privacy and security requirements constrain how the data can be stored and used in an accountable manner. Governing big data becomes even more challenging when it is shared among entities that desire shared responsibility for data ownership, storage and usage.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of features used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for a system that allows for secure, encrypted and distributed ownership and usage of big data and to mitigate some of the obstacles to data sharing.

BRIEF DESCRIPTION OF THE DRAWINGS

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multicore processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial query protocols, or other electronic information exchanging methods. Data exchanges can be conducted over a packet-switched network, the Internet, LAN, WAN, VPN, or other type of packet switched network.

One should appreciate that the systems and methods of the inventive subject matter provide various technical effects, including providing secure, encrypted and distributed ownership and usage of big data.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used herein, ledger, or data repository, refers to a distributed record of transactions. A ledger may be implemented in a blockchain. A blockchain is a distributed network of peer-to-peer electronic devices that process and record transactions as part of a chain of blocks (blocks referring to electronic records or transactions). Once a block is completed, the block is added to the blockchain and the ledger is thereby updated. In many instances, a blockchain may be a ledger of transactions or data in chronological order or may be presented in any other order that is suitable for use by the blockchain network. In some configurations, transactions recorded in the blockchain may include a destination address and a currency or other fields, such that the blockchain records how much currency is attributable to a specific address. In many instances, additional information is captured, such as a time-stamp, source address, and the like.

As used herein, a digital asset is any electronic object such as an access control rule, or a data record, etc. Digital assets can be stored in a ledger. A smart contract is a data operation performed on a ledger. In this specification, virtual data, or derived date, or metadata, refers to data produced as a result of a smart contract (also referred to as an electronic contract) or a data operation. A metadata blockchain contains virtual data. A dataset, or data source, refers to a list of records or virtual records. Datasets can be defined by one or more schemas (e.g., a primary schema and optional schemas that may specify one or more data fields). Datasets and schemas can be stored in a data blockchain. An external data repository refers to data storage outside of the ledger. An external application refers to an application for consuming data from a ledger. An audit log contains records of modifications of data or modifications of data governance. An access control blockchain can be used to protect access to an audit log. Typically, data governance refers to the overall management of the availability, usability, integrity, and security of the data employed in an organization.

The specification is directed to a platform for secure, encrypted and distributed ownership, storage and usage of data, based on blockchain technology. The platform is general but in one example the platform offers significant advantages in an ecosystem of big data stakeholders that define data usage, storage and access based on electronic contracts.

The skilled reader will appreciate that many modern software applications rely heavily on big data, either as a core asset of their basic use cases or as supporting infrastructure to improve their quality of service. At the same time, privacy and security requirements including regulations mandated by different countries, such as HIPAA and GDPR, constrain how data can be stored and used in an accountable manner. Data governance becomes even more challenging when multiple stakeholders belong to a business ecosystem in which data is a core commodity that is exchanged and shared. In these ecosystems, to increase trust and transparency, it is beneficial to have transaction records jointly owned and stored.

According to examples of the present specification, blockchain technology is suitable as a transport layer to implement techniques of distributed transactions. A blockchain implements a distributed ledger, that is a distributed database, jointly operated by the parties or participants of the ecosystem or network. Transactions on the ledger are committed by electronic consensus, speeding up the technical operations of participants.

The present specification discloses a secure and auditable distributed data access and processing platform ("SEAD"). The platform uses blockchain as a data and transaction storage mechanism as well as a mechanism to define non-repudiable electronic contracts on data operations. The platform includes a data workflow definition and execution engine. In this example, a user electronic device specifies the data sources, the sequence of operations on data, as well as the access policies on data and operations. The SEAD system enables participants to: a) share date in a secure and auditable manner on a shared infrastructure; b) store and exchange data in a secure way; c) store and share metadata; d) audit the data access and the operations performed by different users; e) perform analytics on the recorded data and transaction in the blockchain; and f) integrate with public blockchain systems, among other functions.

Disclosed examples according to the present specification offer significant advantages. For example, the SEAD system gives and takes away control of data and operations and it provides full lineage of the data. The SEAD system can also provide lineage of the operations. The activities of a specific user can be replayed. The participants in the ecosystem can decide if the data is to be distributed or if the operations are to run on a specific participant's infrastructure. In one example, the SEAD system is appropriate for Internet of Things ("IoT") systems where there are many participants and small but many distributed data sets.

The term "big data" is generally used to describe collections of data of a relatively large size and complexity, such that the data becomes difficult to analyze and process within a reasonable time, given computational capacity (e.g., available database management tools and processing power). Thus, the term "big data" can refer to data collections measured in gigabytes, terabytes, petabytes, exabytes, or larger, depending on the processing entity's ability to handle the data. As used herein, and unless the context dictates otherwise, the term "big data" is intended to refer to collections of data stored in one or more storage locations and can include collections of data of any size. Thus, unless the context dictates otherwise, the use of the term "big data" herein is not intended to limit the applicability of the inventive subject matter to a particular data size range, data size minimum, data size maximum, or particular amount of data complexity.

Figure 1:
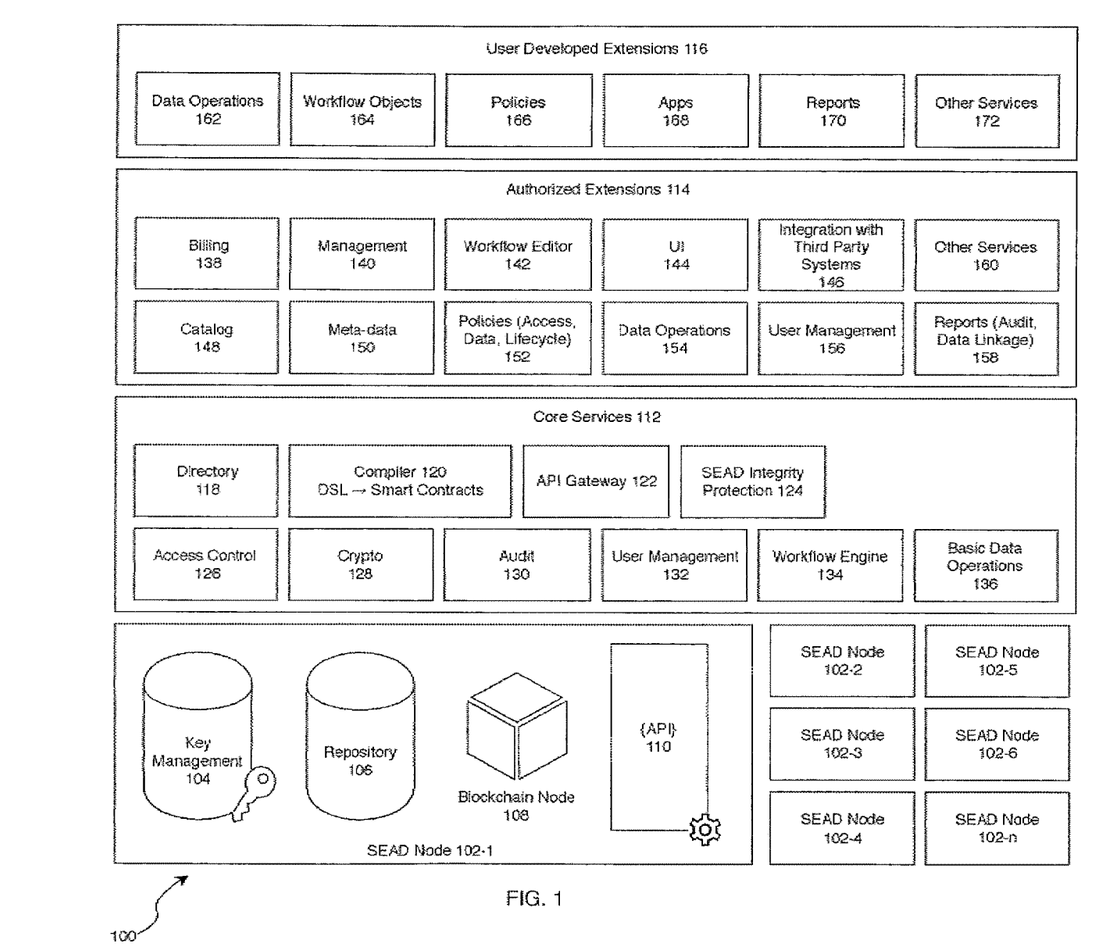
FIG. 1 is a block diagram of a system architecture for secure, encrypted and distributed sharing of data in accordance with an example of the present specification.

FIG. 1 illustrates the architecture of the SEAD system 100. The SEAD system 100 incorporates a distributed ledger (shown as blockchain nodes 108) and shares data among many participants by using a distributed data repository 106, across many SEAD nodes 102. FIG. 1 illustrates multiple SEAD nodes given by reference numbers 102-1, 102-3, 102-4, 102-5, 102-6, . . . 102-n. According to one example, each SEAD node 102 resides under a different participant's administrative domain. Each SEAD node 102 includes a blockchain node 108 and a key management data store 104 as well as a set of APIs 110. FIG. 1 shows the core services 112 of the SEAD system 100: a directory 118 provides an entry point to core basic operations that operates on digital assets stored in the data repository 106; an access control service 126 ensures that each participant accesses only specific digital assets from the data repository 106 and performs only the set of the operations that it has been given permissions to. With the SEAD system 100, selected data segments or digital assets can be encrypted, and copies can be distributed among selected participants using a cryptographic service 128; however, according to one example, the cryptographic keys can be managed by the SEAD system 100 to ensure that the digital assets in the data repository 106 are protected even if distributed to other SEAD nodes 102. The layer of core services 112 offers a basic data operations service 136 that provides atomic operations on the digital assets stored in the data repository 106 of the SEAD nodes 102. Higher level operations and actions, such as data transformations (e.g., for anonymization or privacy reasons) can be expressed in a domain specific language ("DSL") and then compiled into blockchain specific electronic contracts using a compiler 120.

Still with reference to FIG. 1, according to one example of the present specification, the services of the SEAD system 100 can be extended by the user, shown as authorized extensions 114 and user developed extensions 116. Authorized extensions 114 include billing 138, that is, a cryptocurrency service that can be configured to monetize access to data and operations, a user management module 140 that can be configured to integrate with enterprise identity management services. User developed extensions 116 include other data policies 166 and workflow object editors 164. Generally speaking, the user developed extensions 116 layer also allows for integration with external applications as well as external data repositories.

With continued reference to FIG. 1, the user management service 132 supports different roles for users including: a data creator, the owner of new imported data or the owner of a data job created from existing data; and an operation creator, the creator of a data operation. A data operation is any data processing operation such as a query, insert, join, and the like. A data operation has several properties: deterministic (generates the same result from the same input true/false); open source (source code available and binaries can be regenerated on demand true/false); operation creator (list of participants or actors that approved the data operation; price (optional). All data operations may have a clearly defined input and output. In one example, a data operation can be implemented as a model and can be executed as an electronic contract (blockchain smart contract) or an external application. Every execution of data operation can be recorded on the blockchain node 108 or ledger. Higher level data operations include a. Cryptographic transformation—action for encryption/decryption of digital assets
b. Filters—action for removing digital assets
c. Transformation—action for modifying digital assets (e.g. anonymization)
d. Export—action for streaming digital assets to external application or system
e. Query
f. Data import—acting for streaming digital assets for data protection
g. Save into data repository 106
h. Save into blockchain node 108 or ledger According to examples of the present specification, data operations can be run as electronic contracts that execute a sequence of data operations after receiving approval or permission from an access control blockchain (maintained as part of blockchain node 108). According to this example, after a user is granted permission from the access control blockchain, this information can be stored in the blockchain node 108. While the user's permission is not expired and the access control blockchain is not modified, the user can run operations without seeking subsequent permission. The operation can run following a lazy execution principle; the operation or transformation is executed if data should be exported and some data actions are non-deterministic, query or execution was forced by user. If all data operations are deterministic, transformed data will not be recorded into system except when a subset of the digital assets is marked for deletion; or a request for storing digital assets is explicit.

Still with reference to FIG. 1, the data repository 106 is considered system protected data storage. For information stored in the data repository 106, a metadata and integrity checksum can be stored on the blockchain nodes 108 (the ledger). Indexes, system information can be stored in the data repository 106 and the data is not replicated by default between different SEAD nodes 102. The replication can be configured without violating data governance. In one example, all digital assets in the data repository 106 can encrypted by default.

The key management store 104 is a local system deployed for each SEAD node 102 or participant. In one example, the key management store 104 is not a replicated dataset among the SEAD nodes 102. According to one example, the key management store 104 follows these definitions and procedures:

a. Key guard—an electronic contract that protects encryption keys.
b. Key guard family—a collection of key guards that protects the same set of keys. A key guard family assigns a key guard for the temporary giving of access to an encryption key.
c. Key release process—when an access control rule provides a user with permission to access data, the key guard family is notified and requested to release a specific encryption key to a specific cryptographic transformation for data decryption. After the key guard notifies the key management store 104 and requests temporary key release, the key management store 104 provides a URL to the key, and then the key guard can encrypt the URL with a public key of the corresponding cryptographic transformation.

d. Key creation process—When encryption is required on a new dataset, a request is made of the key guard family for a new encryption key. The assigned key guard creates a new public/private key pair if it is a new dataset or new schema, otherwise it offers an existing public key. The private key is added to the key management store 104.

e. Encryption keys are stored in the key management store 104. Every key is protected by a key guard family.

With continued reference to FIG. 1, the access control service 126 manages the access control rules and access control blockchain contained within blockchain node 108. As used herein, an access control rule is a condition on "link" data operations to data or virtual data (virtual data is the data that is generated as a result of data operations). An access control rule records all accesses to data into the blockchain node 108 (ledger). When an access control rule is attached to digital assets or data, the rule can automatically follow all data transformation(s) as long as the rule is not explicitly removed. An access control rule can be implemented as an electronic contract (smart contract). A data owner is allowed to add/remove access control rules. According to one example, all access control rules and access control rule operations can be permanently recorded on the blockchain node 108 (ledger). As used herein, an access control blockchain is a chain of access control rules that protects access to data. The access control blockchain can be contracted automatically for virtual (derived) data which is contracted using data actions.

In this specification, methods and systems for secure, encrypted and distributed ownership and usage of big data are provided.

Figure 2A:
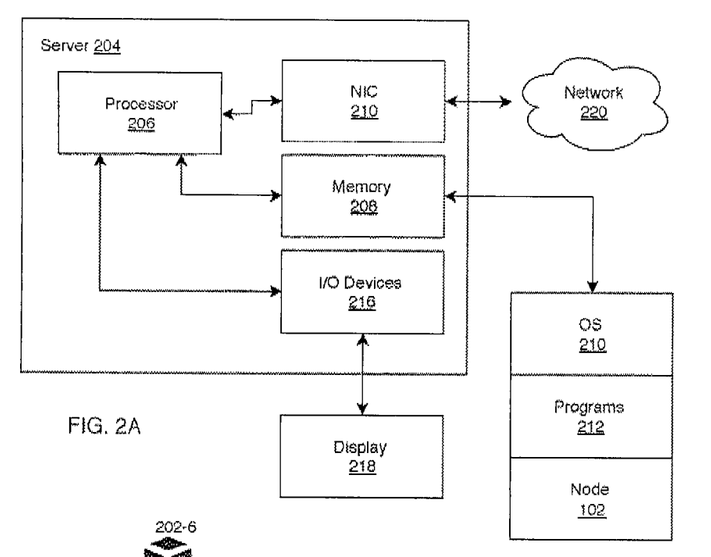
FIG. 2A is a block diagram of a server for running data operations according to the system architecture of FIG. 1 in accordance with an example.

FIG. 2A provides a block diagram of a server 204 for running data operations according to the system architecture of FIG. 1. The server 204 can include one or more computing devices programmed to perform the data operations and blockchain replication functions. Thus, the server 204 can include at least one processor 206, at least one non-transitory computer-readable storage medium shown as memory 208 (e.g., RAM, ROM, flash drive, solid-state memory, hard drives, optical media, etc.) storing computer readable instructions that cause the processors to execute functions and processes of the inventive subject matter, and communication interfaces, such as network interface devices, that enable the server 204 to perform data exchanges with other servers 204 and to create a network of peer-to-peer servers 204. The computer-readable instructions (shown as OS 210 and Programs 212) that the server 204 uses to carry out its functions can be instructions allowing the server 204 to access, retrieve, and process data operations to authorized parties, access control functions, blockchain replication, etc. The server 204 can include input/output interfaces 216 (e.g., keyboard, mouse, touchscreen, display 218, sound output devices, microphones, sensors, etc.) that allow an administrator or other authorized user to enter information into and receive output from the server 204. Examples of suitable computing devices for use as a server 204 can include server computers, desktop computers, laptop computers, tablets, smartphones, smartwatches, wearables, IoT devices, etc.

Figure 2B:
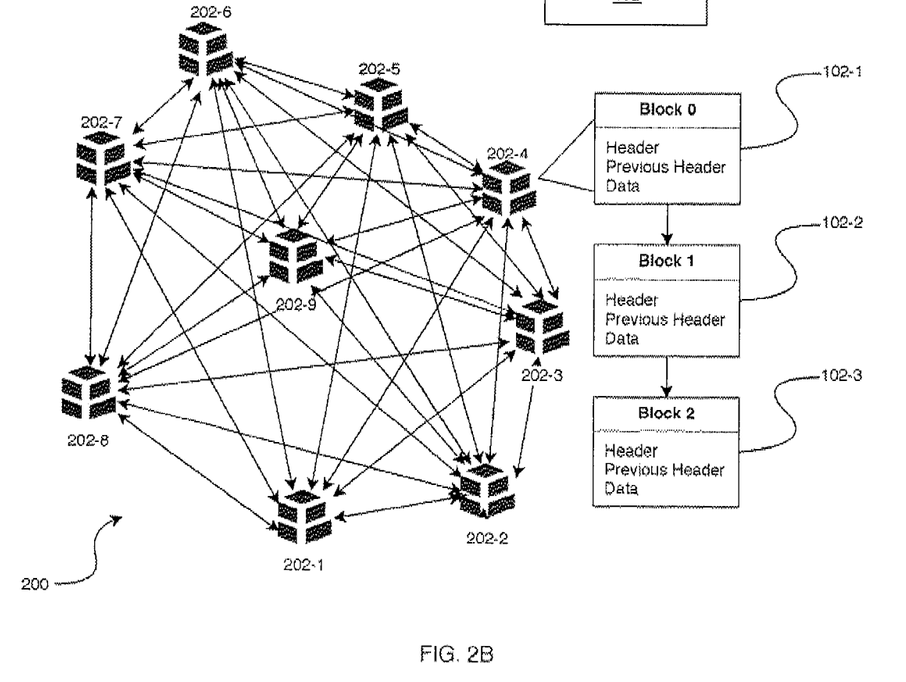
FIG. 2B is a schematic diagram of a system for secure, encrypted and distributed sharing of data in accordance with an example of the present specification.

FIG. 2B is a schematic overview of a networked ecosystem 200 for secure, encrypted and distributed sharing of data. The ecosystem 200 includes one or more nodes 202 (which can be the servers 204 of FIG. 2A) that maintain SEAD nodes 102 (shown as SEAD nodes 102-1, 102-2 and 102-3 in FIG. 1). Each of the components of the ecosystem 200 (shown as the nodes 202-1, 202-2, 202-3, 202-4, 202-5, 202-6, 202-7, 202-8 in FIG. 2) can be communicatively coupled with each other via one or more data exchange networks (e.g., Internet, cellular, Ethernet, LAN, WAN, VPN, wired, wireless, short-range, long-range, etc.).

A user interface of the server 204 can access big data within the SEAD nodes 102. The user interface can comprise one or more computing devices that enables a user or data analyst to access data from SEAD nodes 102 by creating and submitting query jobs.

Flowcharts illustrating examples of data operations are shown in FIG. 3 to FIG. 9. These operations or methods can be carried out by applications or software executed by, for example, the processor of the server 204. The method can contain additional or fewer processes than shown and/or described, and can be performed in a different order. Computer-readable code executable by at least one of the processors to perform the method can be stored in a computer-readable storage medium, such as a non-transitory computer-readable medium.

Secure Basic Data Operations

Figure 3:
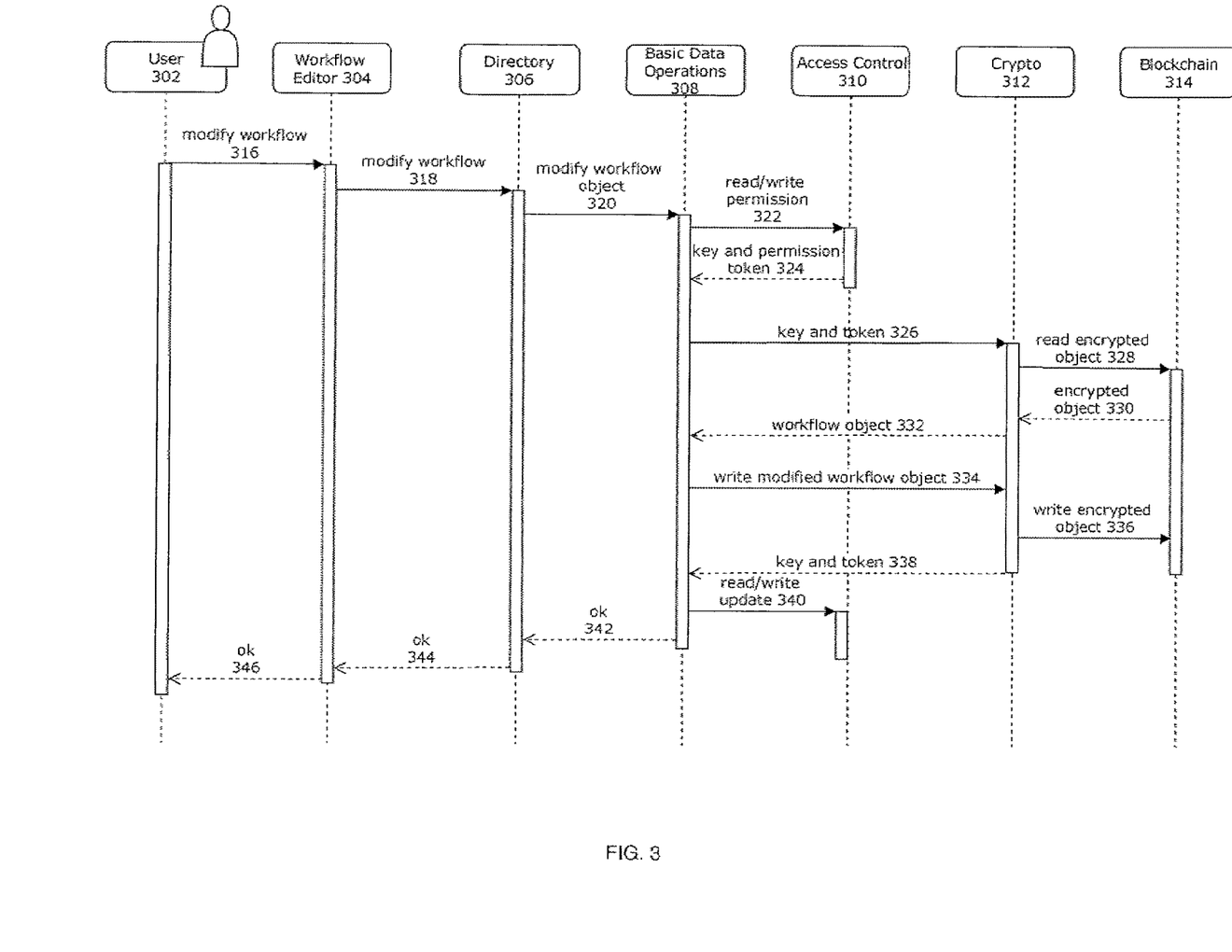
FIG. 3 is a sequence diagram of a data operation running on the system of FIG. 2B in accordance with an example.

With reference to FIG. 3, the electronic device of a user 302 accesses and modifies a workflow object stored in the ledger or blockchain node 108. As used herein, a workflow is a program that defines how data is processed. The sequence of operations involved in the modification of a workflow process is shown in FIG. 3.

Audit Operations

Figure 4:
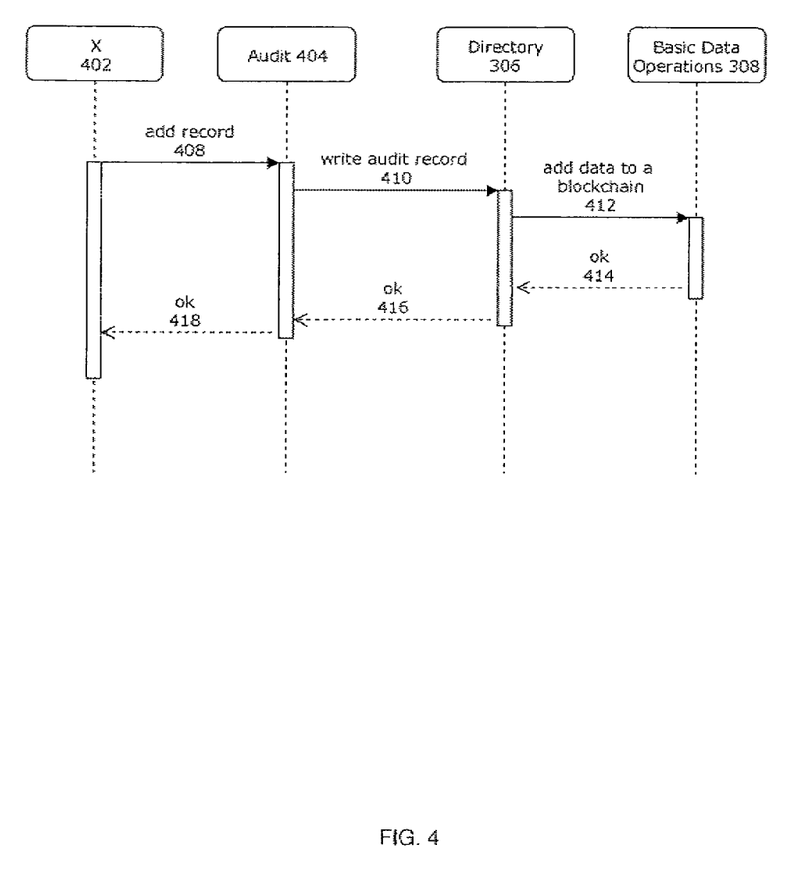
FIG. 4 is a sequence diagram of an audit operation running on the system of FIG. 2B in accordance with an example.

In FIG. 4, the SEAD system 100 can be configured to store in an audit blockchain, all data operations, the input and outputs of each operation, and the workflows, together with user information. At the same time, it logs all changes in the system such as who changed/created an operation. Only authorized users will be able to view data in the audit blockchain. FIG. 4 shows a sequence of operations involved in this scenario up to the Basic Data Operation service. From there on, the calls go through the Access Control, Crypto and Blockchain services (similar to FIG. 3).

Data Storage Operations

Figure 5:
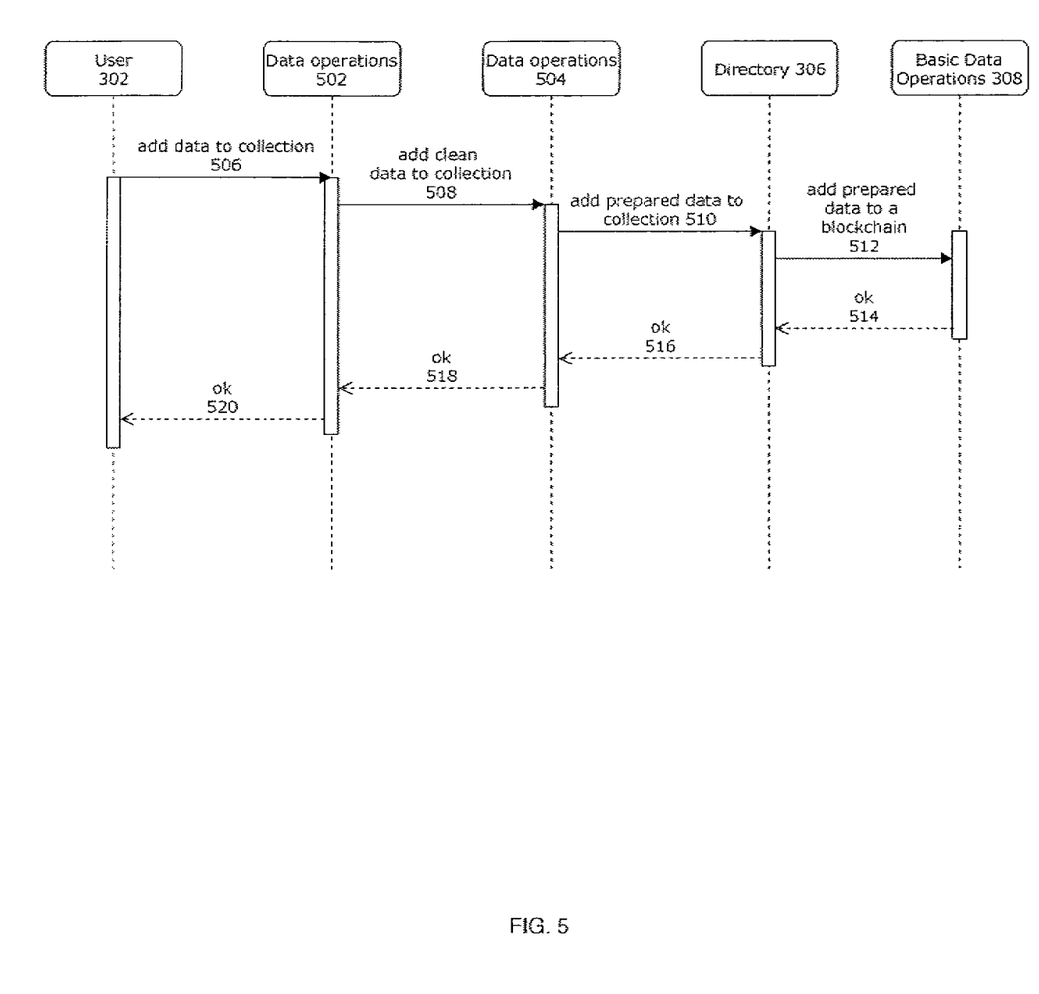
FIG. 5 is a sequence diagram of a data storage operation running on the system of FIG. 2B in accordance with an example.

With reference to FIG. 5, the commodity used by the workflow editors is data, users can configure SEAD to store data records on data blockchain. When a data sharing platform receives new or generates derived data, it can store it on the data blockchain. To protect data, all information can be stored with encryption. FIG. 5 shows the sequence diagram of this use case.

Metadata Operations

Figure 6:
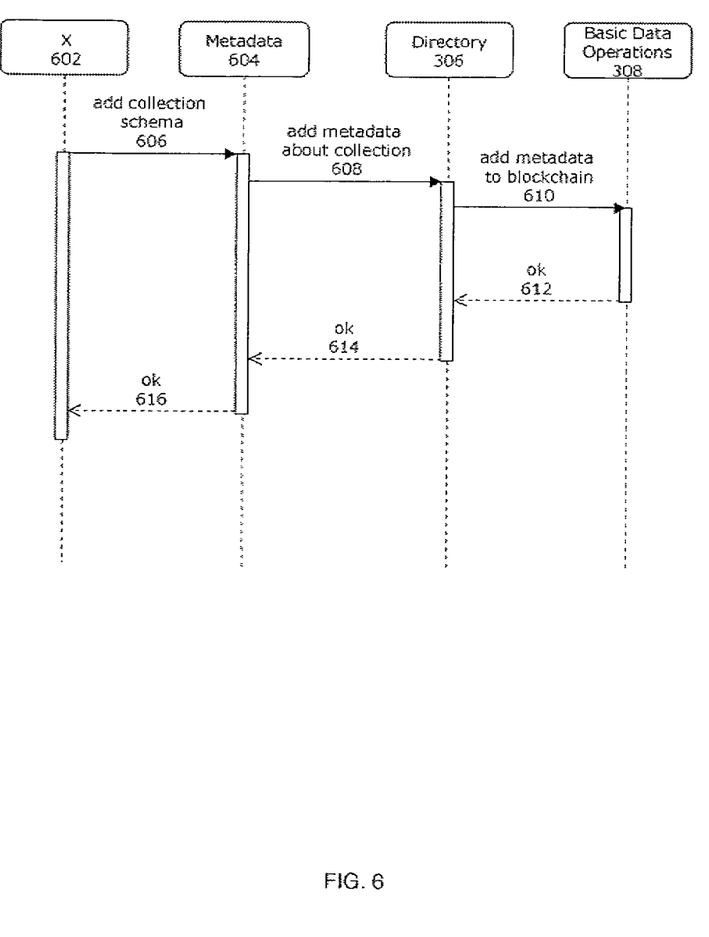
FIG. 6 is a sequence diagram of a metadata operation running on the system of FIG. 2B in accordance with an example.

As shown in FIG. 6, the SEAD system 100 can be configured to store data sources (raw or derived) in a metadata blockchain.

Analytics Operations

Figure 7:
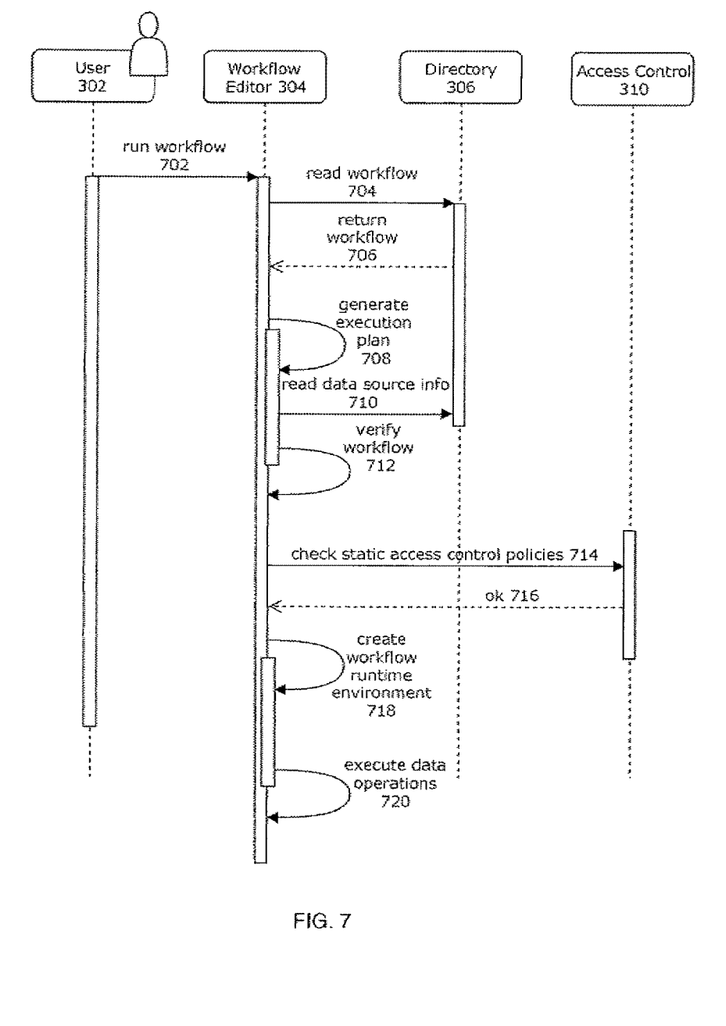
FIG. 7 is a sequence diagram of a blockchain analytics operation running on the system of FIG. 2B in accordance with an example.

As shown in FIG. 7, the SEAD system 100 can be configured to consume data from the audit, data and metadata blockchains and then to run analytic jobs on top of data extracted from the blockchain node 108. To increase performance, data can be offloaded into local storage of the server 204 and then processed locally using a hosting framework for workflow editing and execution. The results can be stored back on the blockchain node 108 or cryptographically sealed and the cryptographic signature will be stored on the blockchain node 108.

Integrity Operations

Figure 8:
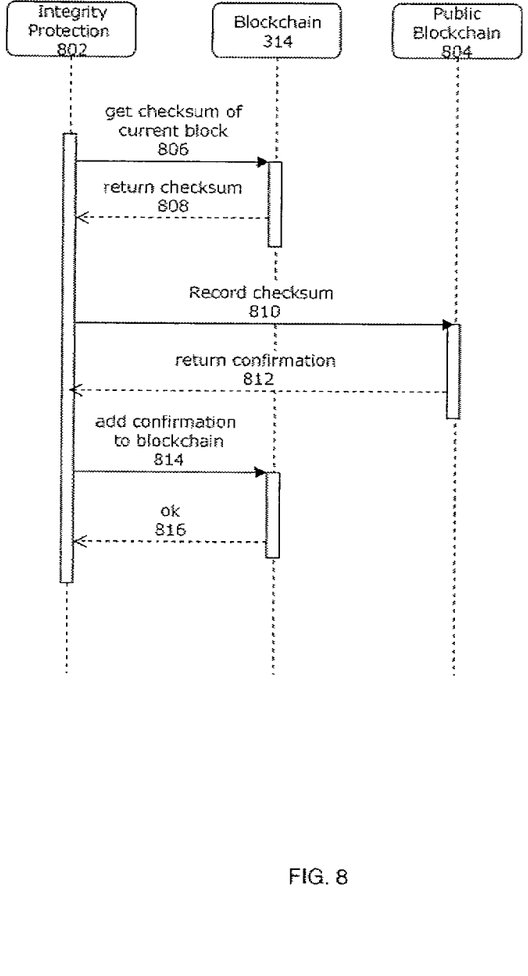
FIG. 8 is a sequence diagram of an integrity protection operation running on the system of FIG. 2B in accordance with an example.

One problem with having a small ecosystem of blockchain nodes is that if one participant controls the majority of the blockchain nodes in a blockchain platform, that participant can modify the blocks. To avoid that, the SEAD system 100 can be modified whereby a number of blocks or transactions must be signed by an external system. The signature can be stored externally and available to all participants (FIG. 8).

Figure 9:
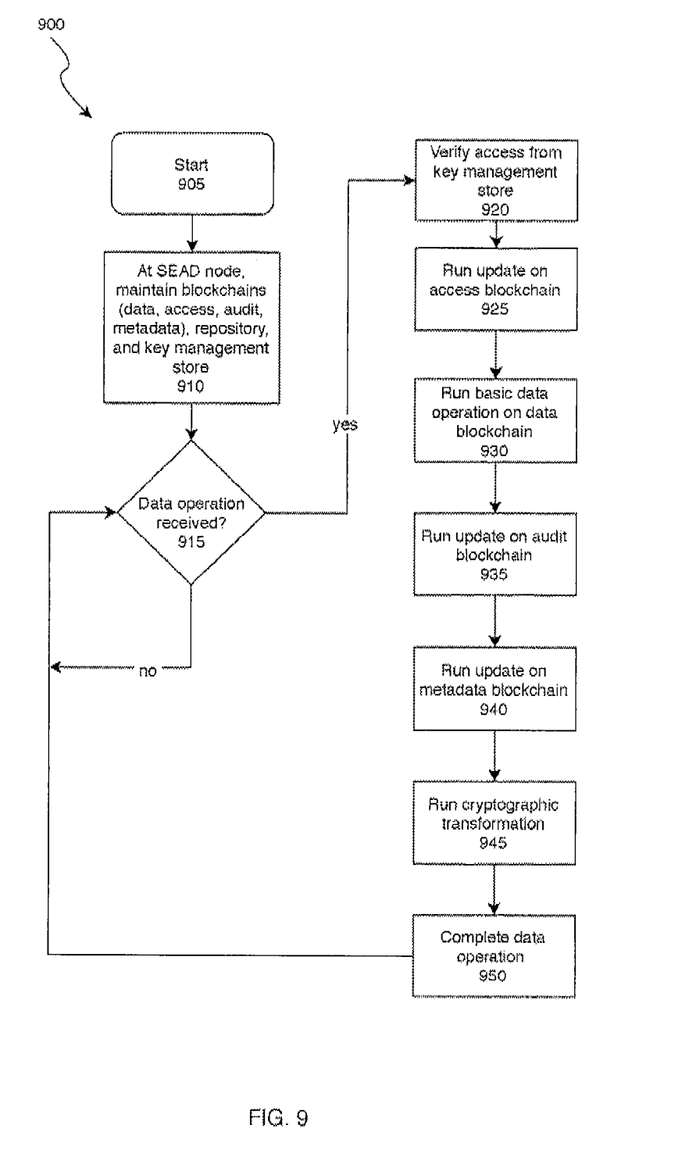
FIG. 9 is a flowchart of a data operation, according to an example of the present specification.

With reference to FIG. 9, a method 900 starts at 905 and, at 910, the server 204 maintains a SEAD node 102. At 915, the server 204 receives a data operation. At 920, the server 204 verifies access from the key management store 104 of the SEAD node 102. At 925, 930, 935, and 940, the access blockchain, data blockchain, audit blockchain, and metadata blockchains are updated, respectively. At 945, a cryptographic transformation is performed. At 950, the data operation is completed, and the method returns to monitor for data operations at 915.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including the steps of: maintaining a local key management data store and a plurality of blockchain copies comprising a data blockchain copy, an audit blockchain copy, and a metadata blockchain copy, wherein each blockchain copy comprises data blocks that are linked and secured using cryptography, receiving a data operation from a user electronic device, verifying that the user electronic device has access against the local key data management store, responsive to the verifying, approving the data operation, after the data operation has been approved, running the data operation and recording metadata about the data operation; updating the plurality of blockchain copies comprising writing first data blocks with the results of the data operation to the data blockchain copy, writing second data blocks with details of the user electronic device to the audit blockchain copy, and writing third data blocks with the recorded metadata to the metadata blockchain copy, and time-stamping and broadcasting the updated plurality of blockchain copies to the peer-to-peer network for replication.

Implementations may include one or more of the following features: the verifying includes requesting a specific encryption key for decrypting data associated with the data operation, receiving the specific encryption key as a key URL, generating an encrypted key URL by encrypting the key URL for providing temporary access to the specific encryption key, and providing the encrypted key URL to the user electronic device. The data operations can include action for removing data, for modifying data, for exporting data to an external application, for querying data, for importing data from an external application, for saving into a local data repository, and for saving into a blockchain node. The data operations can include modifying a workflow object stored in the data blockchain copy. Details of the user electronic device can be written to the audit blockchain copy and includes writing the data operations, an input and an output of the data operation, one or more workflows associated with the data operation, and user information. The data operation can include derived data from a data repository. The method can include performing blockchain replication activities, and before replicating a given block or a given transaction, verifying that the given block or the given transaction has been signed by a trusted external system. The method can include a public data blockchain copy and the method can include reading a checksum from the data blockchain copy, writing fourth data blocks with the checksum to the public data blockchain copy, and receiving a confirmation of the writing of the fourth data blocks to verify the integrity of the data blockchain copy. The data operation can include a data analytics operation that consumes data from the audit blockchain copy, the data blockchain copy and the metadata blockchain copy and further includes running a data analytics job using the consumed data.

One general aspect includes at least one non-transitory computer-readable storage medium storing instructions that, when executed by at least one processor, cause the at least one processor to maintain a local key management data store and a plurality of blockchain copies comprising a data blockchain copy, an audit blockchain copy, and a metadata blockchain copy, wherein each blockchain copy comprises data blocks that are linked and secured using cryptography, receive a data operation from a user electronic device, verify that the user electronic device has access against the local key management data store, responsive to the verifying, approving the data operation, after the data operation has been approved, run the data operation and recording metadata about the data operation, update the plurality of blockchain copies comprising writing first data blocks with the results of the data operation to the data blockchain copy, writing second data blocks with details of the user electronic device to the audit blockchain copy, and writing third data blocks with the recorded metadata to the metadata blockchain copy, and time-stamp and broadcast the updated plurality of blockchain copies to a peer-to-peer network for replication.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method comprising the steps of: at a server comprising a processor, a memory, and a network interface device connected to a peer-to-peer network, maintaining a local key management data store and a plurality of blockchain copies comprising a data blockchain copy, an audit blockchain copy, and a metadata blockchain copy, wherein the blockchain copies comprise data blocks that are linked and secured using cryptography;

receiving a data operation from a user electronic device;

verifying that the user electronic device has access against the local key management data store, wherein the verifying comprises;

requesting a specific encryption key for decrypting data associated with the data operation;

receiving the specific encryption key as a key address;

generating an encrypted key address by encrypting the key address for providing temporary access to the specific encryption address; and providing the encrypted key address to the user electronic device;

responsive to the verifying, approving the data operation;

after the data operation has been approved, running the data operation and recording metadata about the data operation to generate results of the data operation;

updating the plurality of blockchain copies comprising writing first data blocks with the results of the data operation to the data blockchain copy, writing second data blocks with details of the user electronic device to the audit blockchain copy, and writing third data blocks with the recorded metadata to the metadata blockchain copy; and time-stamping and broadcasting the updated plurality of blockchain copies to the peer-to-peer network for replication.

2. The method of claim 1 wherein the data operations comprise action for removing data, for modifying data, for exporting data to an external application, for querying data, for importing data from the external application, for saving into a local data repository, and for saving into a blockchain node.

3. The method of claim 1 wherein the data operation comprises modifying a workflow object stored in the data blockchain copy.

4. The method of claim 1 wherein writing second data blocks with details of the user electronic device to the audit blockchain copy comprises writing the data operation, an input and an output of the data operation, one or more workflows associated with the data operation, and user information.

5. The method of claim 1 wherein data operations comprises deriving data from a data repository.

6. The method of claim 1 further comprising: in communication with a network of peer-to-peer servers, performing blockchain replication activities; and before replicating one of a given block and a given transaction, verifying that the one of a given block and the given transaction has been signed by a trusted external system.

7. The method of claim 1 wherein the plurality of blockchain copies further comprises a public data blockchain copy and the updating the plurality of blockchain copies further comprises: reading a checksum from the data blockchain copy; writing fourth data blocks with the checksum to the public data blockchain copy; and receiving a confirmation of the writing of the fourth data blocks to verify the integrity of the data blockchain copy.

8. The method of claim 1 wherein the data operation comprises a data analytics operation that consumes data from the audit blockchain copy, the data blockchain copy and the metadata blockchain copy and further comprising running a data analytics job using the consumed data.

9. At least one non-transitory computer-readable storage medium storing instructions that, when executed by at least one processor, cause the at least one processor to:

maintain a local key management data store and a plurality of blockchain copies comprising a data blockchain copy, an audit blockchain copy, and a metadata blockchain copy, wherein the blockchain copies comprise data blocks that are linked and secured using cryptography;

receive a data operation from a user electronic device;

verify that the user electronic device has access against the local key management data store wherein the verifying comprises:

requesting a specific encryption key for decrypting data associated with the data operation;

receiving the specific encryption key as a key address;

generating an encrypted key address by encrypting the key address for providing temporary access to the specific encryption key; and providing the encrypted key address to the user electronic device;

responsive to the verifying, approve the data operation;

after the data operation has been approved, run the data operation and record metadata about the data operation to generate results of the data operation;

update the plurality of blockchain copies comprising write first data blocks with the results of the data operation to the data blockchain copy, write second data blocks with details of the user electronic device to the audit blockchain copy, and write third data blocks with the recorded metadata to the metadata blockchain copy; and time-stamp and broadcast the updated plurality of blockchain copies to a peer-to-peer network for replication.

* * * * *